United States Patent
Schellstede

(10) Patent No.: US 7,238,009 B2
(45) Date of Patent: Jul. 3, 2007

(54) OFFSHORE WINDMILL ELECTRIC GENERATORS

(75) Inventor: Herman J. Schellstede, New Iberia, LA (US)

(73) Assignee: Grand Vent Power, LLC, Lake Charles, LA (US)

( * ) Notice: Subject to any disclaimer, the term of this patent is extended or adjusted under 35 U.S.C. 154(b) by 20 days.

(21) Appl. No.: 11/122,473

(22) Filed: May 5, 2005

(65) Prior Publication Data

US 2006/0115363 A1    Jun. 1, 2006

Related U.S. Application Data

(60) Provisional application No. 60/569,077, filed on May 6, 2004.

(51) Int. Cl.
F03D 7/06 (2006.01)
F03D 11/04 (2006.01)
F16M 13/00 (2006.01)

(52) U.S. Cl. .............. 416/244 R; 415/213.1; 415/4.1

(58) Field of Classification Search ......... 415/4.1, 415/4.3, 4.5, 119, 213.1; 416/244 R; 248/562, 248/638, 649, 650
See application file for complete search history.

(56) References Cited

U.S. PATENT DOCUMENTS

| 3,306,562 A | * | 2/1967 | Bellefleur | ............... 248/188.2 |
| 4,260,291 A | | 4/1981 | Young et al. | |
| 4,469,956 A | | 9/1984 | D'Amato | |
| 4,515,525 A | | 5/1985 | Doman | |
| 5,213,470 A | * | 5/1993 | Lundquist | ...................... 416/9 |
| 5,456,047 A | * | 10/1995 | Dorka | ..................... 52/167.4 |
| 6,672,837 B1 | | 1/2004 | Veldkamp et al. | |
| 6,695,588 B1 | | 2/2004 | Nielsen | |

FOREIGN PATENT DOCUMENTS

GB     2365905 A  *  2/2002

OTHER PUBLICATIONS

Ringfeder Damping Technology product descriptions (13 pp. German & English; no date).
Deform plus Ringfeder Friction Springs descrip. (www.ringfeder.com; Feb. 17, 1999 on a figure).
Cape Wind Project construction description (3 pp. at www.capewind.org; Feb. 12, 2004).
Horns Rev Wind Farm project description & newsletters (18 pp. at www. hornsrev.dk; Feb. 12, 2004).
Research and Development in Wind Energy description (19 pp. at www.windpower.org; Jan. 22, 2004).
Söker et al., "Offshore Wind Energy in the North Sea . . . A Study for Greenpeace," Oct. 2000.
PCT Notification Concerning Transmittal of Copy of International Preliminary Report on Patentability (Chapter I of the Patent Cooperation Treaty), Nov. 7, 2006, 1 page.
PCT International Preliminary Report on Patentability, Date of Issuance of this report—Nov. 16, 2006, 1 page.
PCT Written Opinion of the International Searching Authority, Date of Completion of Opinion—Jul. 21, 2006, 5 pages, mailed Sep. 20, 2006.

* cited by examiner

Primary Examiner—Edward K. Look
Assistant Examiner—Dwayne J White

(57) ABSTRACT

The described invention involves the windmill generation of electric power, particularly from offshore windmill generators. The invention involves inserting an adapter between the nacelle of the windmill and the tower, which includes either a leveling device or a vibration dampening device, or both.

5 Claims, 4 Drawing Sheets

OFFSHORE WINDMILL ELECTRIC GENERATORS

CROSS REFERENCE TO RELATED APPLICATIONS

This application claims the benefit of U.S. Provisional Application No. 60/569,077, filed May 6, 2004.

FEDERALLY SPONSORED RESEARCH

Not applicable.

REFERENCE TO MICROFICHE APPENDIX

Not applicable.

FIELD OF THE INVENTION

This invention relates generally to the structure for the generation of electric power using a wind turbine, particularly wind turbines erected in an offshore environment.

The quest for alternative energy sources is a global priority. One source of electric power is wind energy. Throughout the world, wind patterns exist. In prior years, small wind generating systems were developed in which high wind velocities were required. Also the elevation of the wind systems was mounted quite low failing to take advantage of wind velocities, which are increased above the surface of the earth. In recent years, more efficient and larger wind machines have been developed. These machines operate efficiently at low wind velocities of 2.5 meters per second.

BACKGROUND ART

The new wind machines also have been mounted on pedestals, which increase the elevation. This elevation increases the efficiency of the wind machine on an average yearly output. The new generation of wind machines requires very little maintenance, i.e., about 2 times per year. Therefore, the machines can be mounted in remote locations and can operate trouble free for extended periods of time. Due to many political and human nature considerations, many wind machines are now being placed in offshore waters. The distance from the shoreline varies but from the human relations viewpoint, they are usually out of the sight of the land.

The generating systems can be sized between 1.5 megawatts and 3.5 megawatt machines with some wind turbines being operated at 250 kw. The generating systems including blades, gearboxes and control systems, have been proven and tested. The required towers to elevate the generator have also been proven and tested. The offshore oil and gas industries have proven throughout the world that offshore structures can be designed and installed to withstand the harshest atmospheric environment.

New techniques have been developed in the fabrication and installation of these structures. These techniques are useful in the practice of this invention in order to use the most efficient manner to construct, install and maintain offshore wind machines. It is also important to understand that the total cash flow from the wind power machine has a cap due to the sales price of electrical energy onshore. Consequently, the additional cost of installation in providing the structure is of paramount importance.

Offshore structures are designed to accommodate the soil bearing capacity of the sub bottom strata. In some cases, extremely soft bottoms were encountered in delta regions of the world. Also, some sub bottoms are hard rock or coral reef. Therefore, the anchoring system, which is required, varies greatly. Also, if wind machines are placed in hardy conditions, ice conditions are a consideration regarding the structural strength of the structure and materials. Consequently, soil borings are required to assure that the structure will have ample strength to accommodate the weight and overturning moment of the wind machine.

Another consideration is wave and wind conditions to which the structure is subjected. Therefore, the anchoring of the windmill structure will be different in different areas of the world. With all the variables and substantially unpredictable environments where the wind power generation is attempted, it is little under that post construction problems appear which affect the efficiencies of operation of the installations.

While the offshore support structure can be generally constructed as well known in the offshore oil industry and specifically as described in U.S. Pat. No. 4,260,291, two problems have generally developed in connection with the generation of the electric power at these offshore facilities. One such problem is vibration of the structure caused by the wind itself acting upon the structure and the rotation of the windmill blades to turn the generator to develop the electric power. A number of attempts have been made to combat these vibrations problems as described in U.S. Pat. No. 4,515,525 (minimization of the effects of yaw oscillation in wind turbines), U.S. Pat. No. 6,672,837 (wind turbine with an oscillation dampening means) and U.S. Pat. No. 6,695,588 (dampening of oscillations in wind turbines). U.S. Pat. No. 4,469,956 describes a support structure fitted between the windmill and the tower to reduce the communication of vibration from the blades and rotating turbine to the tower. While a number of attempts have been made to solve the vibration problem, much improvement could still be made.

Another problem exists with respect to the offshore windmill electric generators. After a period of time there often is a settling of one or more of the support members affecting the alignment of the structure such that the nacelle and axis of the generator and windmill cease to be level or horizontal. This settling is often exacerbated, if not caused, by the vibration of the tower supporting the windmill. This causes uneven forces to be present during operation creating additional wear and tear and resulting inefficiencies, if not a major reconstruction adjustment of the windmill involved.

SUMMARY OF THE INVENTION

This invention involves solving the problem of vibration and the leveling of the nacelle and generating unit by inserting an adapter between the tower and the nacelle which includes the structure for either or both solutions. This adapter includes the separation from direct contact of the nacelle with the tower and provides an adjustable device for leveling the apparatus for generating the electricity. The vibration dampening is accomplished by a plurality of radially spaced separators contacting the tower structure through shock absorbing thrust washer material placed in an annular space created between a support tube attached to the tower structure and a support shaft attached to the structure carrying the nacelle.

The leveling is accomplished by a plurality of radially disposed support blocks for a leveling base plate carrying the nacelle which are adjustable in height by moving support blocks along an inclined plane using a jack screw which is accessible from the interior of the tower during periods of maintenance.

BRIEF DESCRIPTION OF THE DRAWINGS

Appended hereto are drawings to aid those skilled in the art in the practice of the invention described herein.

DETAILED DESCRIPTION OF THE INVENTION

The installation costs must also be controlled to allow economic benefit to this operation. Therefore, in considering transportation, lifting, assembly, weather conditions, and other factors a lift boat unit appears to be the most economical method by which the installation of the windmill assembly can be accomplished. Lift boats have been used in offshore oil production for years and can operate in water depths of six feet through 200 feet and are also used to erect windmill structure. The lift boat has three or four legs for stability on which the structure is lifted out of the water to the height desired adjacent to the windmill structure for stability purposes. The lift boat would carry the parts the structure to the site and use rotating cranes of about 150-ton capacity to assemble the structure.

In order to facilitate the assembly of the tower assembly and nacelle generating pod, a work platform is required. A work platform is mounted to cantilever beams which can be extended from the bow of the liftboat to the work area on the structure being erected. The platform also includes a hinged section which allows the work platform to be spaced about the diameter of the tower assembly. Personnel and equipment can be transferred to the work area via a walkway which is also mounted to the cantilever beams. Once the platform has completed its duties, it can be retracted onto the liftboat deck for transit purposes.

The wind machines themselves have three major components. First a variable pitch, usually three-bladed fan. The second is a generation system with a gearbox and mounting means usually housed in a nacelle. The support tower, which elevates the hub height approximately 260 feet from the base, sometimes up to about 380 feet, is the third component. The structure is mounted on a base appropriate for the environment in which it is to operate.

Figure 1:
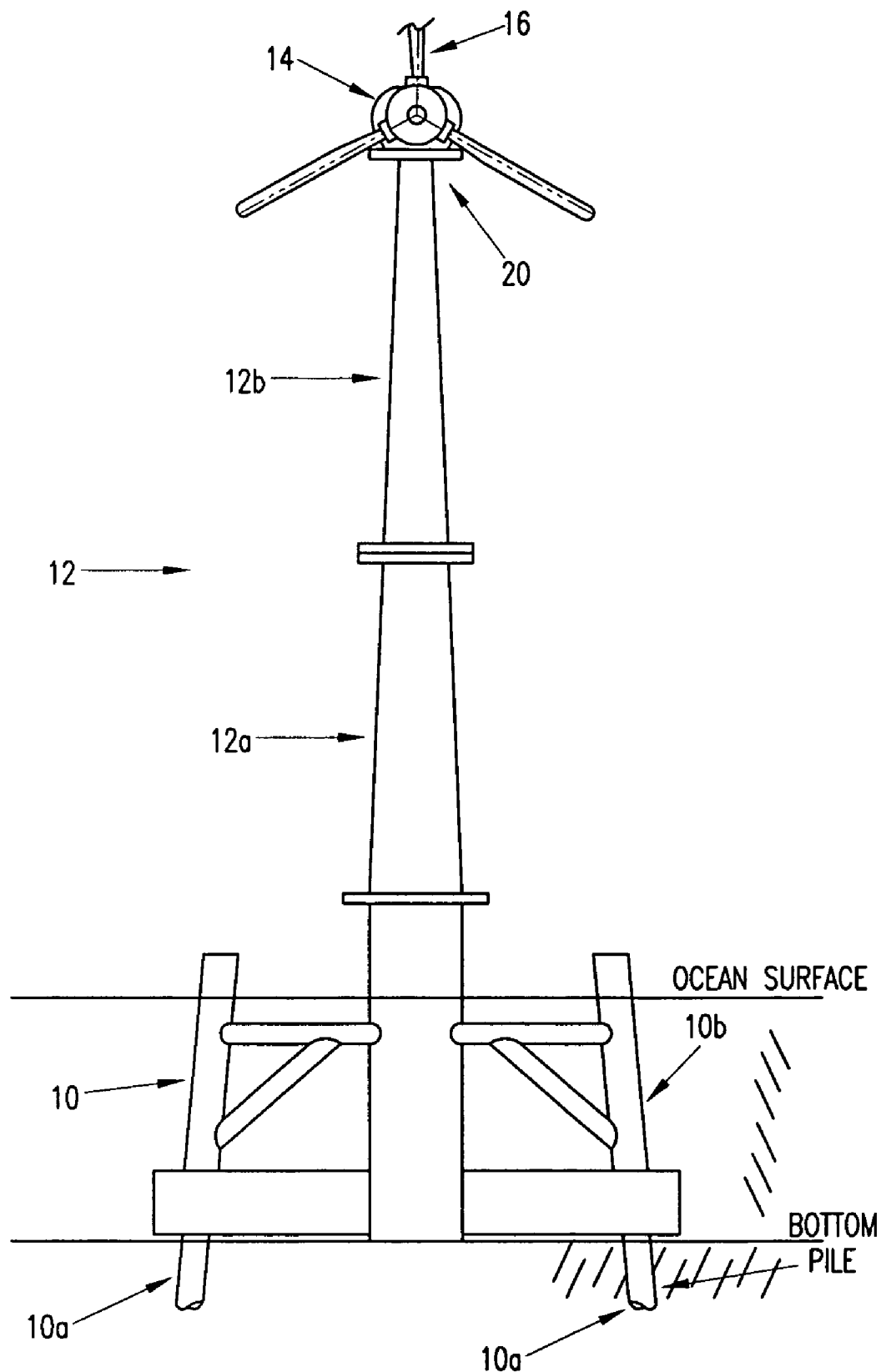
FIG. 1 is a view of an electric generating windmill tower installation in schematic form.
Figure 2B:
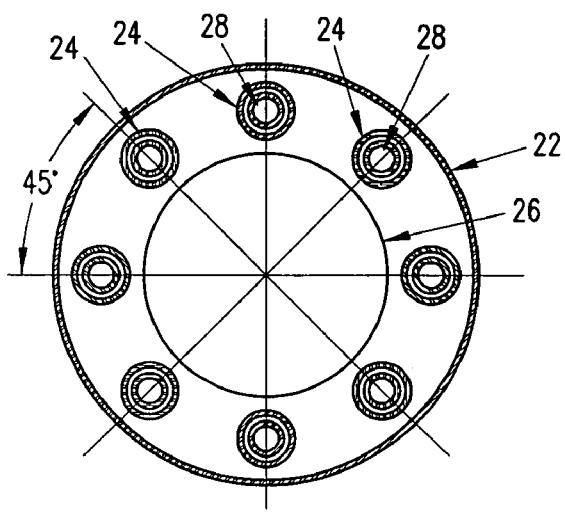
FIG. 2b is a plan view end section showing the orientation of the elements of the vibration dampening device.
Figure 2A:
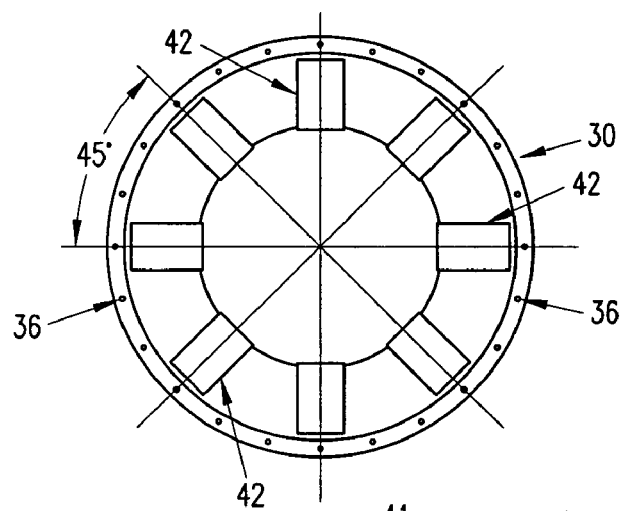
FIG. 2a is a plan view showing the orientation of the adjusting elements in the leveling device.
Figure 2:
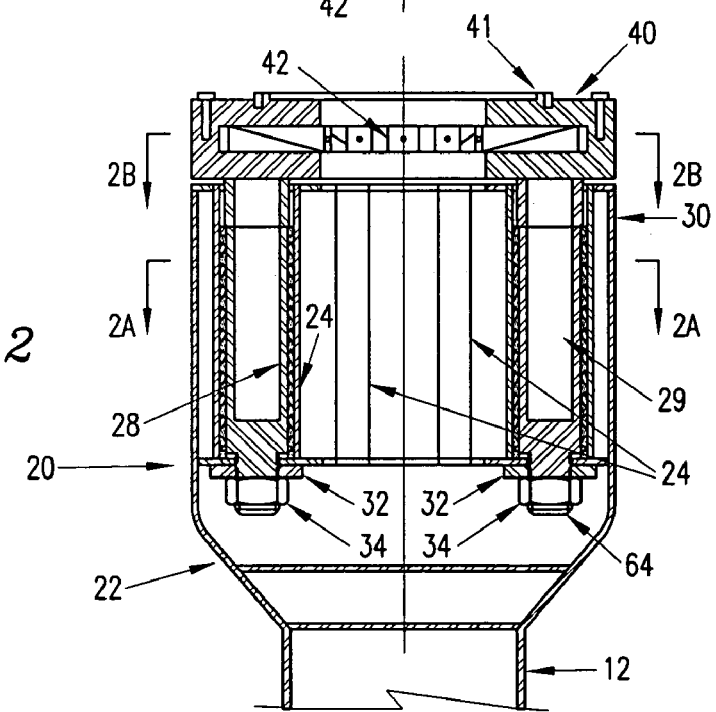
FIG. 2 shows the assembled apparatus, in section, of this invention which includes both the leveling device and the vibration dampening device.

The electric generating windmill of the present invention is situated on a tower as generally shown in FIG. 1. This tower is supported by a base 10 here shown with a plurality of piles 10a driven into the ocean bottom with a jacket 10b prepared to receive the tower 12 shown in FIG. 1 as having two sections 12a and 12b. It is understood that any suitable base construction may be used in the practice of this invention. The Tower 12 is normally sectioned in order to provide for ease of transportation and erection at the site. Of course, more sections could be used than the two as shown. On the tower 12 is a nacelle 14 which houses the generator unit (not shown) and other operative parts known in the art for the overall success of the operation, including a rotatable horizontal shaft generator attached at one end to a plurality of blades 16 oriented to cause the shaft to rotate in response to wind action to generate electric power. The adapter 20 of this invention includes at least one of a vibration dampening device or a leveling table located between the tower 12 and the nacelle 14. While the adapter 20 is shown with the leveling element on top, which is preferred, they may be changed through a simple adjustment of the parts. Greater detail of a combination vibration dampening and leveling device built into a single adapter is shown at FIGS. 2, 2a and 2b and is a preferred embodiment of this invention. The adapter 20 is constructed of an outer shell 22 which is attached to the tower 12 in an appropriate manner, usually by being welded to the tower 12. Of course, one skilled in the art would understand that it could be attached using bolts and flanges. It also includes radially disposed support tubes 24 around the adapter and attached, usually welded, to a base plate 26 as shown in FIGS. 2 and 2b.

In each support tube 24 is a support shaft 28 positioned coaxially with it forming an annular space between the support tube 24 and the support shaft 28. The support shaft 28 is fixed to the lower base plate 30 of the leveling table of this invention. The lower base plate 30 and the support shaft 28 are secured to the adapter 20 through the shell 22 by a reduced diameter shaft 63 through a thrust washer 32 held in place by a pre-tensioning nut 34 on a threaded extension 64. The periphery of the lower base plate 30 is penetrated by a plurality of tapped holes 36 to receive lock bolts 38 to secure the upper leveling based plate 40 which is drilled and tapped with bolt holes 41 to carry the attachment of the nacelle 14. The nacelle 14 may be attached directly to the adapter 20 of this invention or may be attached with some intermediate structure. The lower base plate 30 carries a plurality of radially oriented leveling elements 42 as shown in FIG. 2a. In an embodiment of this invention where only the vibration dampening device is included in the adapter 20, the nacelle 14 would be attached directly to the lower base plate 30.

Figure 3B:
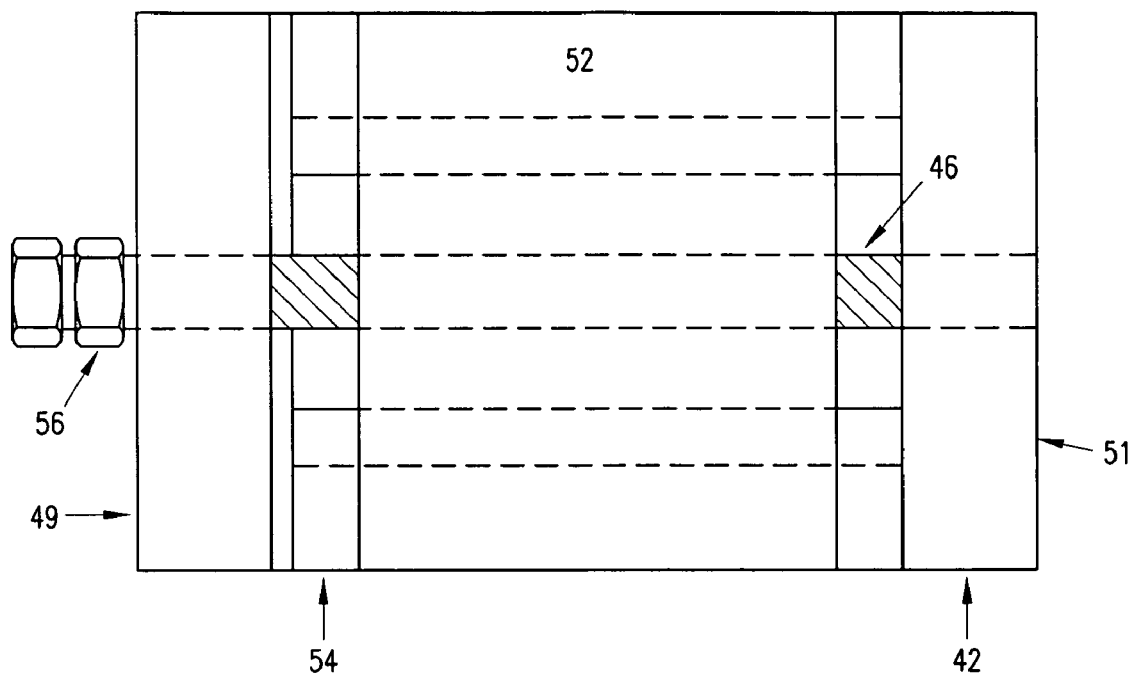
FIG. 3b is a plan view of one element of the leveling device.
Figure 3A:
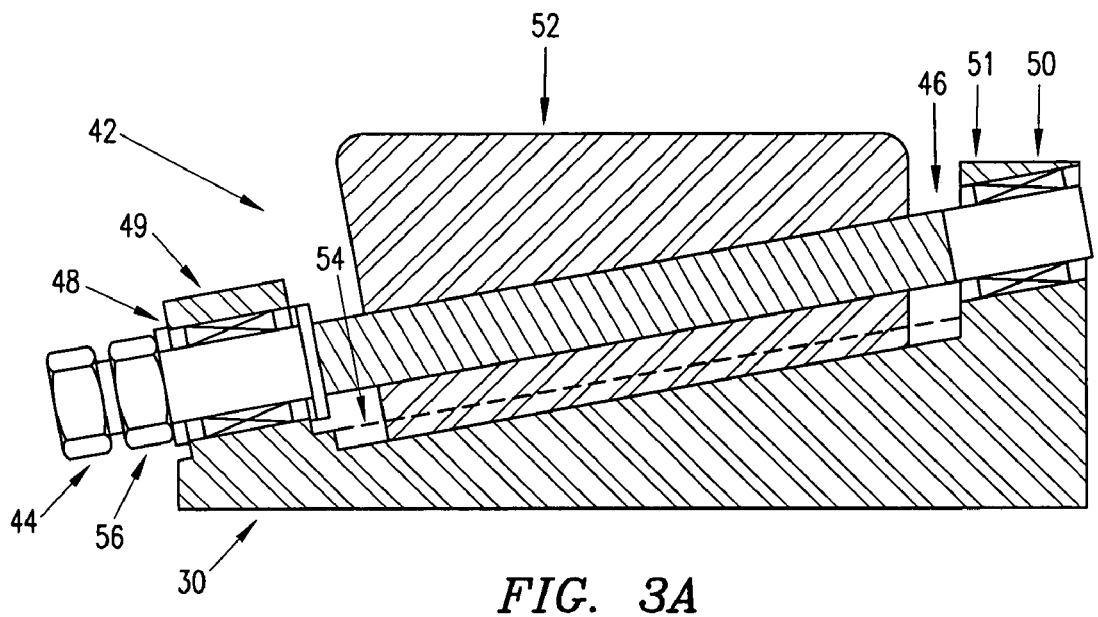
FIG. 3a is an elevation view end section of one element of the leveling device.

The detail of the leveling elements 42 is shown in FIGS. 3a and 3b which includes an adjusting bolt 44 which, when rotated, turns a jack screw 46 which is journaled at both ends through bearings 40 and 50. The bearings 48 and 50 are carried by lips 49 and 51 which are part of, or attached to, lower base plate 30. Rotation of the jack screw 46 by turning the adjusting nut 44 moves a support block 52 along an inclined plane 54 which, as the block 52, moves, will correspondingly raise or lower the upper leveling base plate 40 to accomplish the leveling of the nacelle 14. Once leveled, the support block 52 can be secured in place by tightening down on the adjusting lock nut 56. The inclined plane 54 and lips 49 and 51 are shown in FIG. 3B as a part of lower base plate 30. It is understood that the inclined plane 54 and lips 49 and 51 may be part of a separate piece attached to the lower base plate 30. Using the leveling device of this invention allows the wind generator to be easily leveled from the inside of the tower 12, even while the generator is operating.

Figure 4:
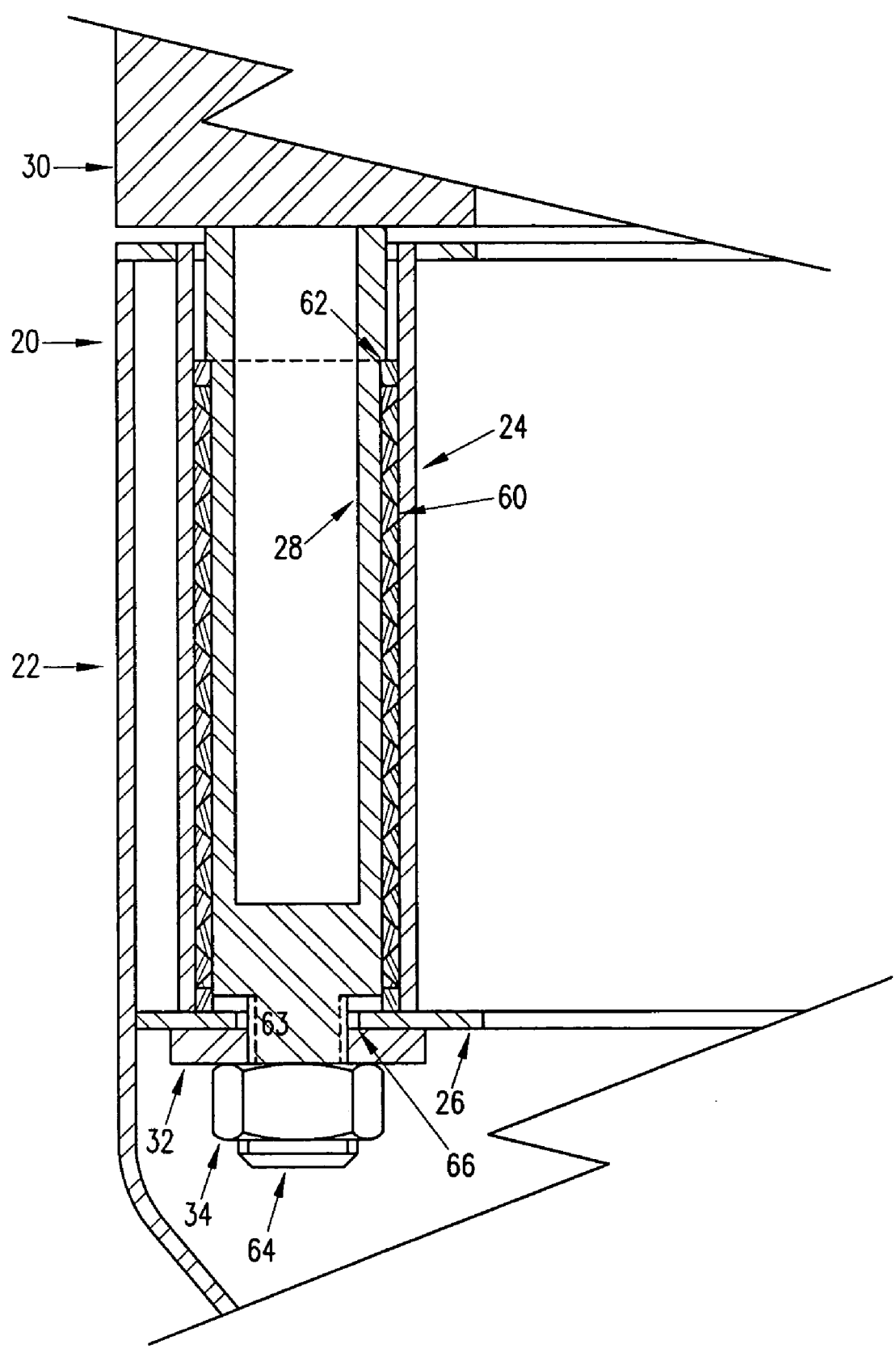
FIG. 4 is an elevation end section of one element of the vibration dampening embodiment of this invention.

FIG. 4 shows the detail of the vibration dampening device constructed of the support tube 24 and the support shaft 28 and the attachment of the support tube 24 to the base plate 26 and the attachment of the support shaft 28 to the lower leveling base plate 30. The annular space between the support tube 24 and support shaft 28 is occupied by a means 60 for isolating the vibration of the support shaft 28 from the support tube 24 and from the tower 12 and the base 10. The isolating means 60 is compressed toward the base plate 26 by a shoulder 62 on the support shaft 28 depending upon the anticipated forces on the windmill. There a small diameter shaft 63 at the end of support shaft 28 extends through the base plate 26 and a thrust washer 32 through a threaded reduced diameter shaft 64 about which the pre-tensioning nut 34 is secured. The smaller diameter shaft 63 creates an annular space 66 in the base plate 26 and therefore does not have hard, direct communication with the tower 12 at any point.

There are many means for separating or isolating metal parts that are satisfactory for use in the practice of this invention such as, for example, fabric washer material, vulcanized rubber shock absorber material, friction springs or deformable shock absorbing units from Ringfeder Corporation (Westwood, N.J.). The preferred material for the isolation means are the Ringfeder friction springs. Other materials which may be satisfactory in some situations are coil springs or bellville springs. Regardless of the means used, one skilled in the art would be able to size and tension the isolation device to serve the windmill structure involved.

In the construction of the wind generator, usual procedures are followed, preferably utilizing a jack-up barge to accomplish the erection and the adapter 20 is lifted into place after the lower leveling base plate 30 is in position and pre-tensioned by tightening the pre-tensioning nut 34 on the threaded reduced diameter extension 64 of the support shaft 28.

When both devices are present in the adapter, the two elements of this invention, the vibration dampener and leveler compliment each other. The leveling device reduces the vibration created by the absence of a level nacelle carrying the generating unit and the vibration dampening structure of this invention prevents or materially reduces the communication of vibration from the power generating apparatus through the tower and thus reduce the stresses placed upon the support for the structure allowing it to remain more level.

This invention, having been described above and shown in accompanying drawings, will lead those skilled in the art to many alternatives and variations without departing from the scope of the claims which follow and are intended to be a part of this invention.

What is claimed is:

1. A windmill for generating electricity comprising:
  (a) a substantially vertical support tower;
  (b) a nacelle, housing a generator of electricity and having a horizontal rotatable shaft;
  (c) a plurality of blades attached to the horizontal rotatable shaft, the blades oriented to rotate the shaft in response to wind action; and
  (d) an adapter with a shell attached to the tower at its lower extremity and to the nacelle on the upper extremity wherein the adapter includes a leveling table comprising a base plate, a leveling base plate and a plurality of radially spaced leveling elements comprising a support block resting on an inclined plane carried by the base plate and supporting the leveling base plate, and an adjusting bolt operatively connected to a screw through the block to the inclined plane such that rotation of the bolt turns the screw which moves the block along the inclined plane to raise or lower the leveling base plate.

2. The windmill of claim 1 wherein the adapter also includes a vibration dampening device comprising a plurality of radially spaced separators which isolate the nacelle, generator and blades from the tower, each separator comprising a support tube attached to the shell and a mating smaller diameter support shaft attached to a base plate supporting the nacelle; which support shaft, when coaxially aligned, create an annular space between the tube and shaft, the annular space occupied by a means for isolating vibration of the support shaft from the support tube.

3. The windmill of claim 2 wherein the means for isolating vibration of the support shaft from the support tube is a series of friction springs.

4. The windmill of claim 3 wherein the friction springs are held by thrust washers on each end.

5. The windmill of claim 1 wherein the installation is made offshore.

* * * * *